(No Model.) 2 Sheets—Sheet 1.
W. EVANS.
SCREW CUTTING ATTACHMENT.
No. 436,078. Patented Sept. 9, 1890.
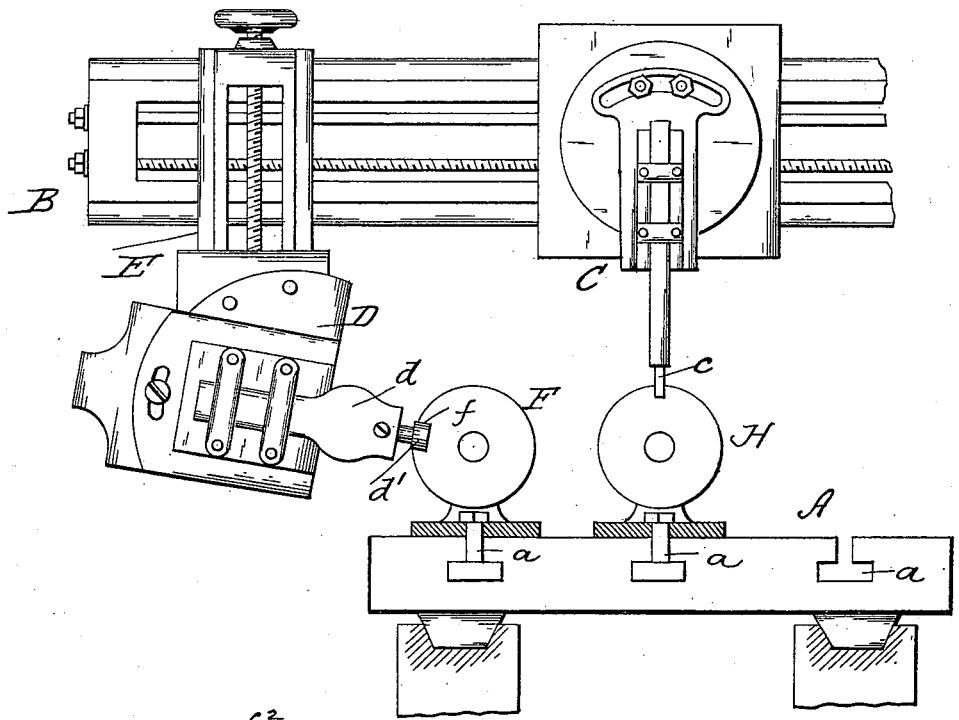
WITNESSES:
John Buckey
George H. Kaiser
INVENTOR
William Evans
By S. J. Van Stavoren
attorney (No Model.) 2 Sheets—Sheet 2.
W. EVANS.
SCREW CUTTING ATTACHMENT.
No. 436,078. Patented Sept. 9, 1890.
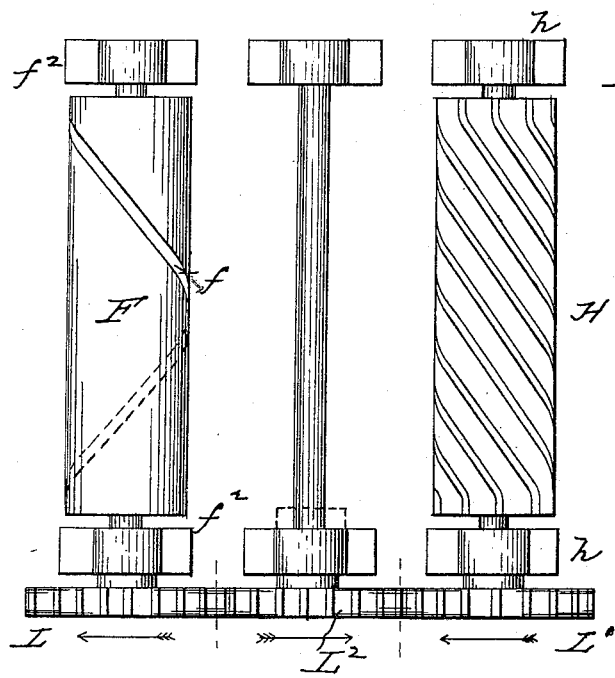
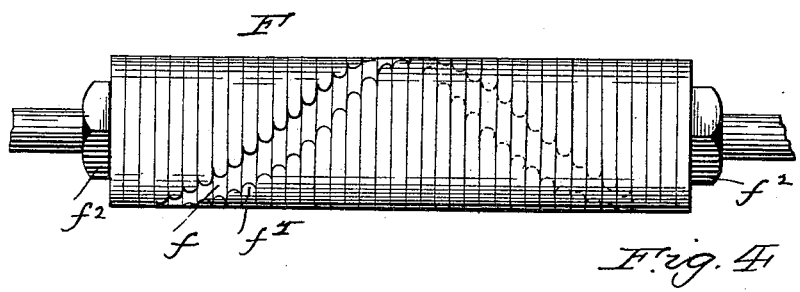
WITNESSES:
John Buckey
George M. Kaiser
INVENTOR,
William Evans
By S. J. Van Stavoren
Attorney

UNITED STATES PATENT OFFICE.

WILLIAM EVANS, OF PHILADELPHIA, PENNSYLVANIA.

SCREW-CUTTING ATTACHMENT.

SPECIFICATION forming part of Letters Patent No. 436,078, dated September 9, 1890.

Application filed April 24, 1890. Serial No. 349,268. (No model.)

*To all whom it may concern:*

Be it known that I, WILLIAM EVANS, a citizen of the United States, residing at Philadelphia, in the county of Philadelphia and State of Pennsylvania, have invented certain new and useful Improvements in Screw-Cutting Attachments, of which the following is a specification.

My invention has relation to devices for cutting quick screw or spiral grooves or threads; and it has for its object to provide a simple and efficient device which may be attached to metal planing, surfacing, or like machines, and which is actuated to cut the grooves or threads without the use of the screw-cutting gear usually employed in screw-cutting lathes and like machines, and by means of which a right or left screw or thread, or a combination of right and left thread, or of part straight and curved thread, may be cut, as desired.

My invention accordingly consists of the combinations, constructions, and arrangements of parts, as hereinafter described in the specification, and pointed out in the claims, having reference particularly to the provision of a reciprocating and rotary jack or former for controlling the cutting of the thread or groove upon the shaft or roller in which the quick screw-threads or grooves are to be cut, said jacks being so constructed or made that either different jacks are required for different threads or quickness of threads, or one jack answers for various quicknesses and kinds of threads or grooves.

Reference is had to the accompanying drawings, wherein—

Figure 1 is a sectional elevation showing the adjustable transverse tool-carrying bar of a planer, the reciprocating planer-bed with my improved attachment applied thereto. Fig. 2 is a plan view of the jack and roller or shaft to be cut in gear with one another and detached from the planer-bed, the same showing a left-hand jack for cutting a right-hand thread or groove. Fig. 3 is a like view showing the same jack in gear with the roller or shaft to cut a left-hand thread or groove in said shaft or roller; and Fig. 4 is a plan of a jack composed of numerous adjustable disks or sections for varying the configuration or direction of the pitch as well as the pitch of the thread or groove therein.

A represents a reciprocating planer or other bed, and B the adjustable transverse tool-holding bar, which are of the usual or other suitable construction. The frame of the planer and the actuating devices for the bed A are not shown in the drawings, as they are well known and form no part of my improvements.

Upon the bar B is the holder C for the cutter $c$, and D is another like holder, vertically adjustable in a frame E, adjustable on bar B, said holders being constructed in the well-known ways and in themselves form no part of the invention.

In the holder D is suitably supported a bar $d$, having at its outer extremity a roller or trunnion-head $d'$. The bar $d$ is supported in the frame of holder D, as shown, in order that it may be adjustable in any direction to cause its roller $d'$ to enter or fit a spiral or other groove $f$ in a jack F, having end journals $f'$, supported in bearings or boxes $f^2$ on the planer-bed A', said bearings or boxes $f^2$ being adjustable in the longitudinal grooves $a$ of the planer-bed A' in the well-known way.

The groove $f$ in the jack F is a pattern or form of the groove which is to be cut in a separate shaft cylinder or roller H, supported in boxes or bearings $h\ h$, also secured to and adjustable on the planer-bed the same as those for the jack F, and the latter is in gear with said roll or shaft H by means of gear-wheels L L', respectively, attached to one end of the axes or journals of the jack and roller, as more plainly shown in Fig. 2.

The jack F and roll or shaft H are adjusted upon the planer-bed A and bolted firmly thereto in gear with one another, the roll or shaft H being in line with the cutter $c$. The holder D is then adjusted to locate the roller $d'$ on bar $d$ in the slot or groove $f$ in the jack, and said holder is firmly set in position to keep the bar $d$ and its end roller $d'$ stationary. The planer-bed is then reciprocated, and as it makes its to-and-fro movement the fixed roller $d'$ rotates the jack F, which in turn rotates the shaft or roll H in unison therewith, so that the fixed cutter $c$ will cut a groove or thread in roller or shaft H corresponding with that in the jack F.

When the roll or shaft H and jack F are in direct gear with each other, as indicated in Fig. 2, the groove cut in the roll H has a pitch the same as that of the groove in the jack, but is in a reverse direction—that is to say, if a left-hand groove or jack is used, a right-hand groove is made in roll H, and vice versa—as the roll H rotates oppositely to the rotation of the jack.

By inserting an idler-gear $L^2$ between the gears L L', as indicated in Fig. 3, the groove or thread in the roll or shaft H has the same direction as that of the groove or thread in the jack.

If the jack, roll, or cylinder is in one piece, then different jacks are used for threads or grooves of varied configuration and pitch. If, however, the jack is composed of a series of disks $f$, as indicated in Fig. 4, then by adjusting said disks relatively to one another at different pitches different directions and configurations of grooves or threads may be formed on the jack, and a single jack answers for a variety of work.

When a sectional jack is employed, the grooves or threads in each section or disk have, preferably, rounded sides, as shown at $f'$, Fig. 4, to admit of adjustment of said disks to form the various grooves or threads, said disks being held firmly together by screw nuts or clamps $f^2$ at the ends of the jack.

By providing the jack with any quick single or double thread or groove or succeeding reverse grooves or straight and curved grooves, as desired, corresponding grooves or threads are cut in the shaft or roll H.

As the construction and arrangement of the parts of the foregoing-described attachment may be changed without departing from the spirit of my invention, I do not confine myself to the same as shown and described.

What I claim is—

1. The combination, with a reciprocating bed, of a jack or former mounted in bearings secured to said bed, a roller or shaft mounted in bearings secured to said bed, gear-connection between said jack and roller or shaft, and a fixed stud or roller engaging with said jack or former, substantially as set forth.

2. A screw-cutting attachment comprising a jack or former, a shaft or roller, a reciprocating bed supporting said jack and roller, gear-connection between said jack and roller, a fixed pin for engagement with said jack, and an adjustable support or bracket for said pin, substantially as set forth.

3. In a screw-cutting attachment, the jack F, having pattern groove or thread, and gear-wheel, combined with a fixed stud or roller engaging with jack and a reciprocating support or table for said jack, substantially as set forth.

4. In a screw-cutting device, the jack F, composed of adjustable sections, substantially as set forth.

5. A screw-forming jack composed of a number of disks adjustable upon their axes and each having peripheral groove or grooves, substantially as set forth.

In testimony whereof I affix my signature in presence of two witnesses.

WILLIAM EVANS.

Witnesses:
 FRANK H. MASSEY,
 S. J. VAN STAVOREN.